(12) United States Patent
Whang et al.

(10) Patent No.: US 9,672,251 B1
(45) Date of Patent: Jun. 6, 2017

(54) EXTRACTING FACTS FROM DOCUMENTS

(71) Applicant: Google Inc., Mounatin View, CA (US)

(72) Inventors: Steven Euijong Whang, Mountain View, CA (US); Rahul Gupta, Mountain View, CA (US); Alon Yitzchak Halevy, Los Altos, CA (US); Mohamed Yahya, Saarbruecken (DE)

(73) Assignee: Google Inc., Mountain View, CA (US)

( * ) Notice: Subject to any disclaimer, the term of this patent is extended or adjusted under 35 U.S.C. 154(b) by 295 days.

(21) Appl. No.: 14/499,615

(22) Filed: Sep. 29, 2014

(51) Int. Cl.
*G06F 17/30* (2006.01)

(52) U.S. Cl.
CPC .............................. *G06F 17/30528* (2013.01)

(58) Field of Classification Search
CPC ............... G06F 17/30; G06F 17/30424; G06F 17/30011; G06F 17/30707; G06F 17/30528
USPC .................................................. 707/600–899
See application file for complete search history.

(56) References Cited

U.S. PATENT DOCUMENTS

2006/0293879 A1* 12/2006 Zhao et al. ....... G06F 17/30864 704/9

OTHER PUBLICATIONS

Finkel et al., "Incorporating Non-local Information into Information Extraction Systems by Gibbs Sampling," In Proceedings of the 43rd Annual Meeting of the ACL, Ann Arbor, Michigan, USA, Jun. 2005, pp. 363-370.

Gupta et al, "Biperpedia: An Ontology for Search Applications," In Proceedings of the VLDB Endowment, 2014, pp. 505-516.

Haghighi and Klein, "Simple Coreference Resolution with Rich Syntactic and Semantic Features, " In Proceedings of Empirical Methods in Natural Language Processing, Singapore, Aug. 6-7, 2009, pp. 1152-1161.

Madnani and Dorr, "Generating Phrasal and Sentential Paraphrases: A Survey of Data-Driven Methods," In Computational Linguistics, 2010, 36(3):341-387.

de Marneffe et al., "Generating Typed Dependency Parses from Phrase Structure Parses," In Proceedings of Language Resources and Evaluation, 2006, pp. 449-454.

Mausam et al., "Open Language Learning for Information Extraction," In Proceedings of Empirical Methods in Natural Language Processing, 2012, 12 pages.

Mikolov et al., "Efficient Estimation of Word Representations in Vector Space," International Conference on Learning Representations (ICLR), Scottsdale, Arizona, USA, 2013, 12 pages.

Mintz et al, "Distant Supervision for Relation Extraction Without Labeled Data," In Proceedings of the Association for Computational Linguistics, 2009, 9 pages.

* cited by examiner

*Primary Examiner* — Isaac M Woo
(74) *Attorney, Agent, or Firm* — Fish & Richardson P.C.

(57) ABSTRACT

Methods, systems, and apparatus, including computer programs encoded on computer storage media, for extracting facts from a collection of documents. One of the methods includes obtaining a plurality of seed facts; generating a plurality of patterns from the seed facts, wherein each of the plurality of patterns is a dependency pattern generated from a dependency parse; applying the patterns to documents in a collection of documents to extract a plurality of candidate additional facts from the collection of documents; and selecting one or more additional facts from the plurality of candidate additional facts.

25 Claims, 6 Drawing Sheets

EXTRACTING FACTS FROM DOCUMENTS

BACKGROUND

This specification relates to information extraction from electronic documents.

Information extraction systems automatically extract structured information from unstructured or semi-structured documents. For example, some information extraction systems that exist extract facts from collections of electronic documents, with each fact identifying a subject entity, an attribute possessed by the entity, and the value of the attribute for the entity.

SUMMARY

In general, this specification describes techniques for extracting facts from collections of documents.

In general, one innovative aspect of the subject matter described in this specification can be embodied in methods that include the actions of obtaining a plurality of seed facts, wherein each seed fact identifies a subject entity, an attribute possessed by the subject entity, and an object, and wherein the object is an attribute value of the attribute possessed by the subject entity; generating a plurality of patterns from the seed facts, wherein each of the plurality of patterns is a dependency pattern generated from a dependency parse, wherein a dependency parse of a text portion corresponds to a directed graph of vertices and edges, wherein each vertex represents a token in the text portion and each edge represents a syntactic relationship between tokens represented by vertices connected by the edge, wherein each vertex is associated with the token represented by the vertex and a part of speech tag, and wherein a dependency pattern corresponds to a sub-graph of a dependency parse with one or more of the vertices in the sub-graph having a token associated with the vertex replaced by a variable; applying the patterns to documents in a collection of documents to extract a plurality of candidate additional facts from the collection of documents; and selecting one or more additional facts from the plurality of candidate additional facts.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Particular embodiments of the subject matter described in this specification can be implemented so as to realize one or more of the following advantages. A fact extraction system can accurately extract facts, i.e., (subject, attribute, object) triples, from a collection of electronic documents to identify values of attributes, i.e., "objects" in the extracted triples, that are not known to the fact extraction system. In particular, values of long-tail attributes that appear infrequently in the collection of electronic documents relative to other, more frequently occurring attributes can be accurately extracted from the collection. For example, given a set of attributes for which values are to be extracted from the collection, the attributes in the set can be ordered by the number of occurrences of each of the attributes in the collection and the fact extraction system can accurately extract attribute values for the long-tail attributes in the set, with the long-tail attributes being the attributes that are ranked below N in the order, where N is chosen such that the total number of appearances of attributes ranked N and above in the ranking equals the total number of appearances of attributes ranked below N in the ranking Additionally, the fact extraction system can accurately extract facts to identify values of nominal attributes, i.e., attributes that are expressed as nouns.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
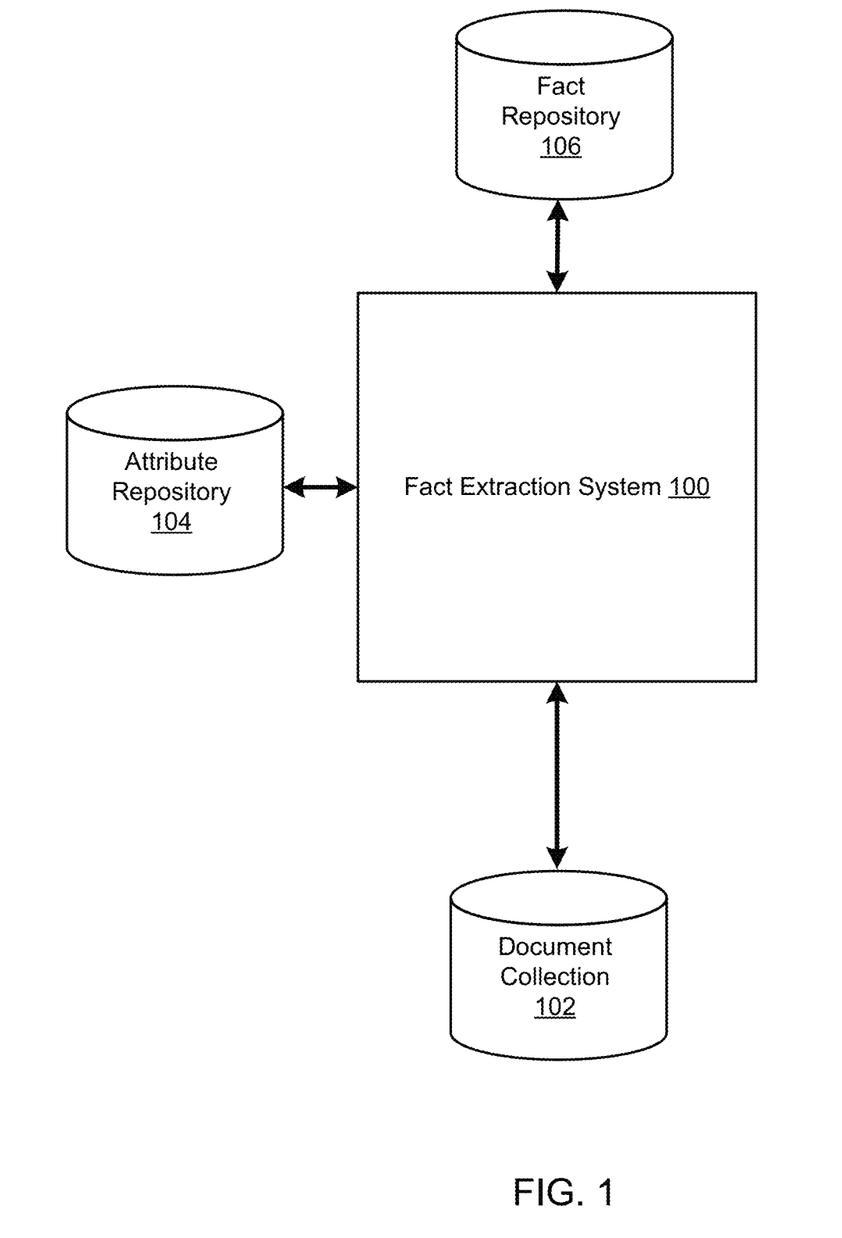
FIG. 1 shows an example fact extraction system.

FIG. 1 shows an example fact extraction system 100. The fact extraction system 100 is an example of a system implemented as computer programs on one or more computers in one or more locations, in which the systems, components, and techniques described below can be implemented.

The fact extraction system 100 extracts facts from a collection of documents 102. The collection of documents 102 includes multiple electronic documents. For example, the documents in the collection of documents 102 can include one or more of news articles, blog posts, product reviews, and so on.

Each fact extracted by the fact extraction system 100 from the collection of documents 102 is extracted as a (subject, attribute, object) triple. The subject in the triple identifies an entity, the attribute in the triple identifies an attribute possessed by the entity, and the object identifies a value of the attribute for the entity. Example entities include people, places, countries, landmarks, animals, historical events, organizations, businesses, sports teams, sporting events, movies, songs, albums, games, works of art, fictional characters, and so on.

The facts extracted by the fact extraction system 100 may identify the subject entities, object entities, and attributes in various ways. For example, each triple generated by the fact extraction system 100 may include a recognized name of the subject entity, the name of the attribute, and a recognized name of the object entity. For example, one of the facts extracted by the fact extraction system 100 from the collection of documents 102 may be (Example Organization, Chief Economist, Example Economist), indicating that Example Economist is the Chief Economist of Example Organization.

As another example, in each triple, an identifier for the entity or the attribute may be used in place of one or more of the names. In the case of the attribute, the identifier may be an identifier associated with the attribute in an attribute repository 104 or in a database that stores information about entities and attributes possessed by those entities, e.g., a database of structured data. In the case of the entities, the identifier may be an identifier associated with the entity in the entity database.

The entity database may be, e.g., a graph database that includes nodes that represent entities and identifies the type of each entity represented by a node and links between nodes that represent relationships between entities, with the type of the link between two nodes identifying the type of relationship that exists between the entities represented by the nodes. An example of an online database of structured data that exists is the Freebase database that is accessible on the Internet at http://www.freebase.com.

The fact extraction system 100 extracts facts for attributes from the attribute repository 104. The attribute repository 104 stores data identifying attributes possessed by entities of one or more entity types. Generally, for a given entity type, the attribute repository 104 includes attributes that appear frequently in the collection of documents 102 and long-tail attributes that appear relatively infrequently in the collection of documents 102. For example, for entities of the type "organization," the attribute "Chief Executive Officer" may appear frequently in the collection of documents 102, while the attributes "chief economist" and "philanthropic arm" may be long tail attributes that appear relatively infrequently in the collection of documents 102.

Once extracted, the fact extraction system 100 may store the extracted facts in a facts repository 106 or provide the facts for use for some other purpose. In some cases, the extracted facts may be used by an Internet search engine in providing formatted answers in response to search queries that have been classified as seeking to determine the value of an attribute possessed by a particular entity. For example, a received search query "who is the chief economist of example organization?" may be classified by the search engine as seeking to determine the value of the "Chief Economist" attribute for the entity "Example Organization." By accessing the fact repository 106, the search engine may identify that the fact repository 106 includes a (Example Organization, Chief Economist, Example Economist) triple and, in response to the search query, can provide a formatted presentation that identifies "Example Economist" as the "Chief Economist" of the entity "Example Organization."

Figure 2:
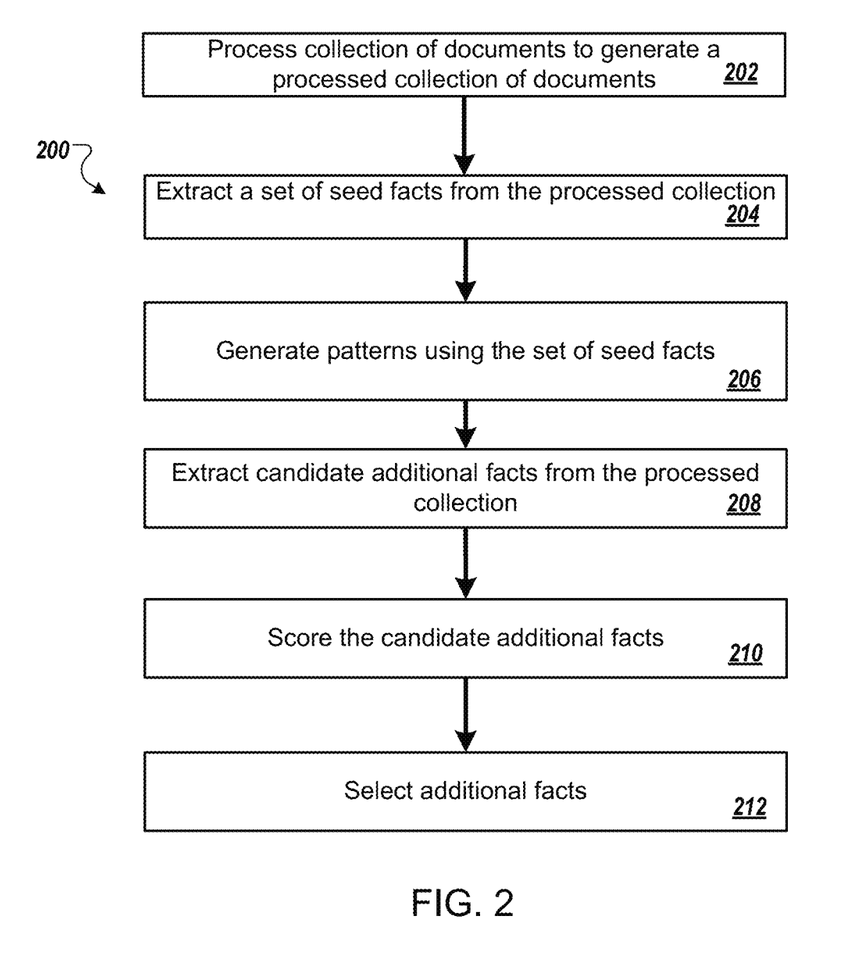
FIG. 2 is a flow diagram of an example process for extracting facts from a collection of documents.

FIG. 2 is a flow diagram of an example process 200 for extracting facts from a collection of documents. For convenience, the process 200 will be described as being performed by a system of one or more computers located in one or more locations. For example, a fact extraction system, e.g., the fact extraction system 100 of FIG. 1, appropriately programmed in accordance with this specification, can perform the process 200.

The system processes a collection of documents, e.g., the collection of documents 102 of FIG. 1, to generate a processed collection of documents (step 202). In particular, the system processes the documents in the collection of documents to generate dependency parses of sentences in each of the documents. A dependency parse of a sentence corresponds to a directed graph of vertices and edges. Each vertex of the graph represents a token from the sentence, e.g., a word, phrase, symbol, or other meaningful element in the sentence, and each edge in the graph represents a syntactic relationship in the sentence of the tokens represented by the vertices that the edge connects. Each vertex in the dependency parse is associated with the token that the vertex represents and a part of speech tag that identifies the part of speech of the token in the sentence. Dependency parses and techniques for generating dependency parses are described in more detail in Marie-Catherine de Marneffe, Bill MacCartney, and Christopher D. Manning; *Generating Typed Dependency Parses from Phrase Structure Parses*; In Proceedings of Language Resources and Evaluation, 2006. Once generated, the system can store the dependency parses in any of a variety of ways, e.g., as JavaScript Object Notation (JSON) objects or arrays, in Extensible Markup Language (XML) documents, or in protocol buffers for documents.

The system also processes the documents in the collection of documents using a coreference resolver to identify occurrences of references to entities in the documents and, for each occurrence, to identify the entity to which the occurrence refers. For example, the system may process each document using a coreference resolver that clusters entity references in the document into clusters, with each cluster including references to the same entity. An example coreference resolver is described in more detail in Aria Haghighi, Dan Klein; *Simple Coreference Resolution with Rich Syntactic and Semantic Features*; In Proceedings of Empirical Methods in Natural Language Processing, 2009.

Optionally, the system can also process the documents using an entity resolver that resolves each cluster to an identifier in the entity database of the entity to which the references in the cluster refer. An example entity resolver is described in Finkel et al., *Incorporating Non-local Information into Information Extraction Systems by Gibbs Sampling*, ACL 2005.

In some implementations, rather than processing the collection of documents, the system may receive a processed collection of documents, with the documents in the collection already having been processed in the manner described above.

The system extracts a set of seed facts from the processed collection of documents (step 204). Generally, the system extracts the set of seed facts from the processed collection of documents using a set of extraction rules. Extracting seed facts using extraction rules is described below with reference to FIG. 3.

The system generates patterns using the set of seed facts (step 206). Generally, the patterns are dependency patterns generated from dependency parses of sentences in documents in the processed collection of documents. A dependency pattern corresponds to a sub-graph of a dependency parse, where, for at least one of the vertices of the graph, the token associated with the vertex has been replaced by a variable while the part of speech tag associated with the vertex has been retained. Generating dependency patterns using a set of seed facts is described below with reference to FIG. 4. Once generated, the system can store the dependency patterns in any of a variety of ways, e.g., as JSON objects or arrays, in XML documents, or in protocol buffers for documents.

The system extracts candidate additional facts from the collection of documents (step 208). In order to extract the candidate additional facts, the system applies the patterns to sentences from documents in the collection. Generating candidate additional facts by applying patterns is described below with reference to FIG. 5.

The system scores the candidate additional facts (step 210). Generally, the system determines a score for a given candidate additional fact from scores for each pattern used to generate the candidate additional fact. Determining scores for patterns and using those scores to determine a score for a candidate additional fact is described below with reference to FIG. 6.

The system selects additional facts from among the candidate additional facts based on the scores (step 212). For example, the system can select each candidate additional fact having a score above a threshold value as an additional fact. As another example, the system can select a predetermined number of highest-scoring candidate additional facts as additional facts. The system can store the selected additional facts in a fact repository, e.g., the fact repository 106 of FIG. 1, or provide the selected additional facts to an external system for use for some immediate purpose.

Figure 3:
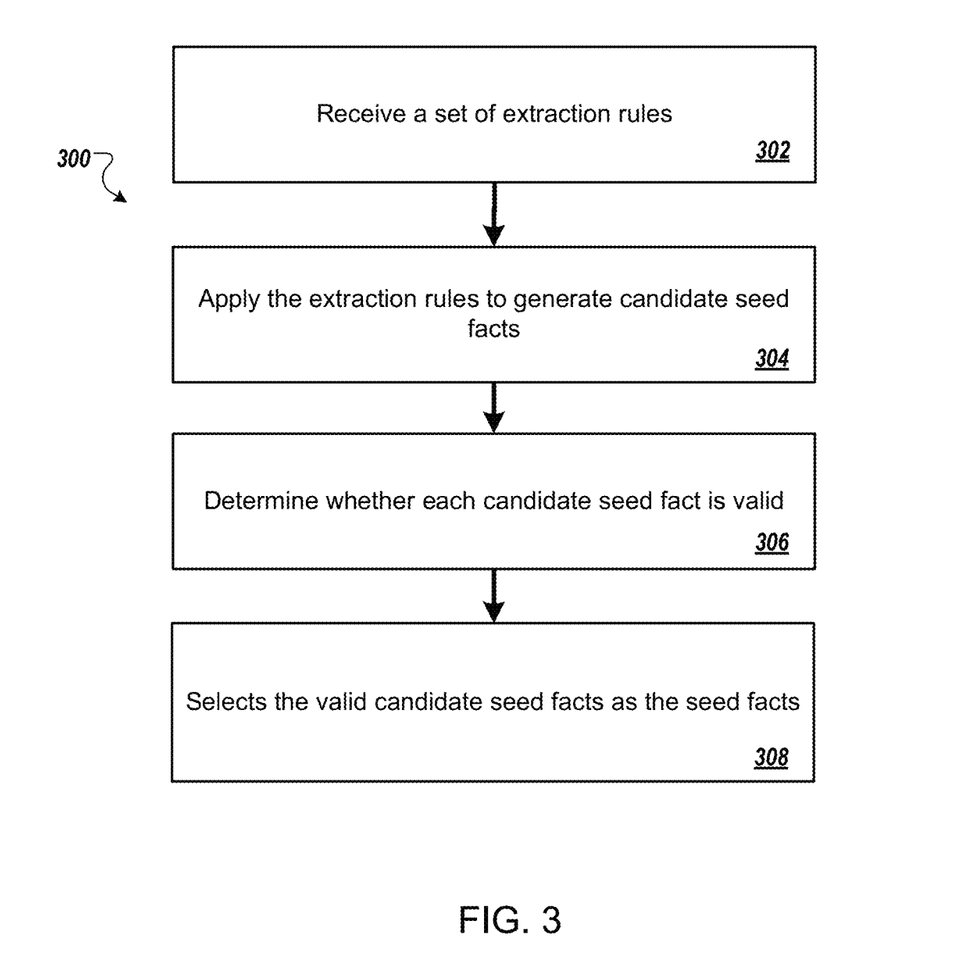
FIG. 3 is a flow diagram of an example process for extracting seed facts from a collection of documents using a set of extraction rules.

FIG. 3 is a flow diagram of an example process 300 for extracting seed facts from a collection of documents using a set of extraction rules. For convenience, the process 300 will be described as being performed by a system of one or more computers located in one or more locations. For example, a fact extraction system, e.g., the fact extraction system 100 of FIG. 1, appropriately programmed in accordance with this specification, can perform the process 300.

The system receives a set of extraction rules (step 302). The extraction rules in the set of extraction rules can be predetermined rules for generating a (subject, attribute, object) triple from text. For example, one extraction rule may specify that for a text fragment that is of the form "the A of S, O," the (subject, attribute, object) triple that should be generated is (S, A, O). As another example, another extraction rule may specify that for a text fragment that is of the form "O, [the] A of S," the (subject, attribute, object) pair that should be generated is (S, A, O), where [the] being inside of brackets indicates that the inclusion of "the" in the text fragment is optional.

The system applies the extraction rules to extract candidate seed facts from the collection of documents (step 304). That is, the system applies each extraction rule to documents from the collection of documents to identify text fragments that satisfy the form identified in the extraction rule and generates a (subject, attribute, object) triple from each text fragment as specified by the extraction rule.

The system determines whether each candidate seed fact is valid (step 306). In particular, for each (subject, attribute, object) triple, the system determines whether the attribute is identified as an attribute in an attribute repository, e.g., the attribute repository 104 of FIG. 1. If the attribute does not appear in the attribute repository, the system determines that the candidate seed fact is not valid. In some implementations, if the attribute appears in the attribute repository, the system also determines whether the attribute and object corefer in the text fragment from which the candidate seed fact was extracted. That is, the system determines whether the attribute and the object were classified as referring to the same entity in the text fragment by the coreference service when the collection of documents was processed. In these implementations, the system determines that the candidate seed fact is valid only if the attribute of the candidate seed fact is identified as an attribute in the attribute repository and the attribute and object of the candidate seed fact corefer in the text fragment from which the candidate seed fact was extracted.

The system selects the valid candidate seed facts as seed facts (step 308).

Figure 4:
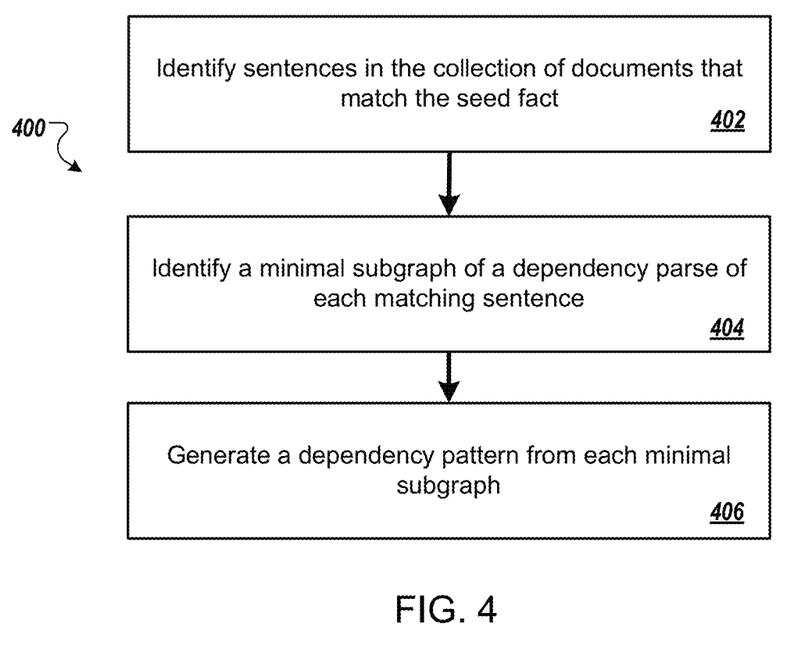
FIG. 4 is a flow diagram of an example process for generating dependency patterns from a seed fact.

FIG. 4 is a flow diagram of an example process 400 for generating dependency patterns from a seed fact. For convenience, the process 400 will be described as being performed by a system of one or more computers located in one or more locations. For example, a fact extraction system, e.g., the fact extraction system 100 of FIG. 1, appropriately programmed in accordance with this specification, can perform the process 400.

The system identifies sentences in the collection of documents that match the seed fact (step 402). The system determines that a sentence matches a seed fact if the sentence contains the attribute in the seed fact, one or more tokens that have been classified as referring to the same entity as the subject in the seed fact, and one or more tokens that have been classified as referring to the same entity as the object in the seed fact.

The system identifies a minimal sub-graph of the dependency parse of each of the matching sentences (step 404). For a given sentence that matches a seed fact, the minimal sub-graph of the dependency parse of the matching sentence is the smallest portion of the dependency parse that includes vertices that represent the head tokens of the subject, attribute, and object of the seed fact. The head token of a subject, attribute, or object is the syntactic root of the tokens that make up the subject, attribute, or object tokens. For example, for the "executive chairman" attribute, "chairman" is the head token while "executive" is the noun compound modifier for the head token.

The system generates a dependency pattern from each minimal sub-graph (step 406). The system generates a dependency pattern from a minimal sub-graph by delexicalizing the three vertices that represent the head tokens of the subject, attribute, and object. That is, the system replaces the token associated with each of the vertices with a variable but retains the part of speech tag associated with vertex.

Optionally, the system can also modify the part of speech tags associated with the vertices. For example, if the part of speech tags specify that the subject, attribute, or objects are proper nouns or common nouns, the system can generalize the tags to indicate that either proper nouns or common nouns are acceptable.

Once the system has generated dependency patterns from each of the seed facts, the system stores data that associates each dependency pattern with the attributes for which the pattern can generate facts. That is, the system associates each pattern with the attribute from each seed fact that was used to generate the pattern. Optionally, the system can discard dependency patterns that were not generated by more than a threshold number of unique seed facts.

Figure 5:
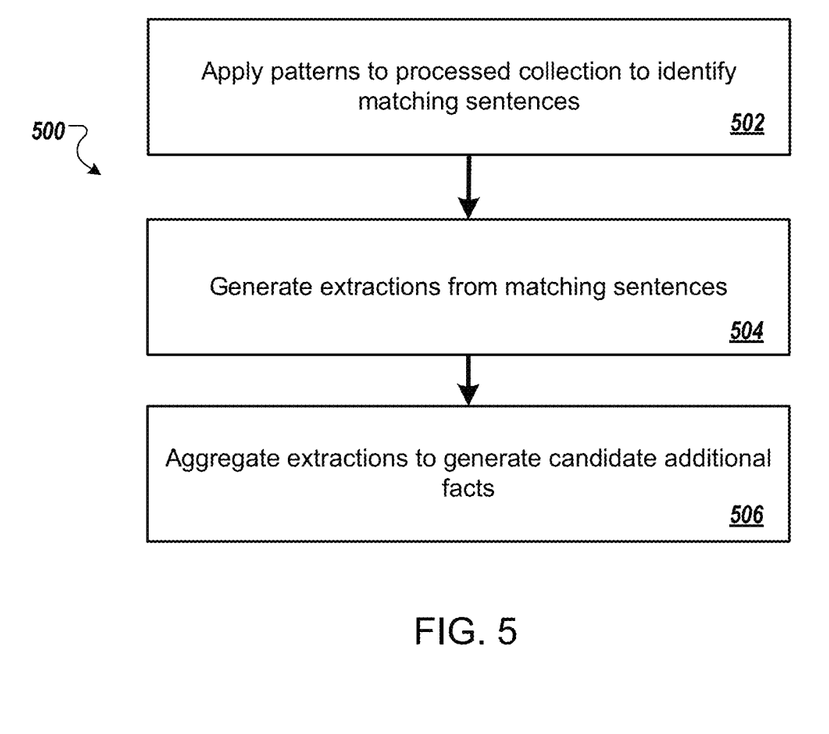
FIG. 5 is a flow diagram of an example process for extracting candidate additional facts using dependency patterns.

FIG. 5 is a flow diagram of an example process 500 for extracting candidate additional facts using dependency patterns. For convenience, the process 500 will be described as being performed by a system of one or more computers located in one or more locations. For example, a fact extraction system, e.g., the fact extraction system 100 of FIG. 1, appropriately programmed in accordance with this specification, can perform the process 500.

The system applies the dependency patterns to the processed collection of documents to identify matching sentences (step 502). That is, for each dependency pattern, the system identifies dependency parses of sentences that match the dependency pattern. A dependency parse matches a dependency pattern if the dependency parse contains a portion for which each vertex and each edge matches the dependency pattern.

For vertices of the dependency pattern that are associated with a token and a part of speech, another vertex matches the vertex if the tokens associated with the vertices are the same and the parts of speech associated with the vertices (i) are the same or (ii) the part of speech associated with the other vertex is subsumed by the part of speech associated with the vertex in the dependency pattern, e.g., if the part of speech for the other vertex is proper noun and the part of speech for the dependency pattern is noun.

For vertices of the dependency pattern that are associated with a variable rather than a fixed token, another vertex matches the vertex if the parts of speech associated with the vertices match or if the part of speech associated with the vertices (i) are the same or (ii) the part of speech associated with the other vertex is subsumed by the part of speech associated with the vertex in the dependency pattern.

Additionally, the system determines whether the phrase in the dependency parse that is headed by the head token that matches the attribute vertex of the dependency pattern matches any of the attributes that are associated with the dependency pattern, i.e., any of the attributes for which the pattern can generate facts. If the phrase matches one of the attributes, the system determines that the dependency parse matches the dependency pattern.

The system generates an extraction from each matching sentence (step 504). That is, the system resolves the phrases in the matching sentence that are headed by the token that matches the subject vertex of the dependency pattern and the token that matches the object vertex of the dependency pattern to respective entities in the entity database. The system then generates an extraction that is of the form of a (resolved subject, attribute, resolved object) triple. As described above, in some implementations, one or more of the elements of the triple are identifiers that identify the entity or attribute referred to by the element.

The system aggregates the extractions to generate candidate additional facts (step 506). That is, for each extraction that generated the same (resolved subject, attribute, resolved object) triple, the system generates a single candidate additional fact. The system also associates the candidate additional fact with data identifying the patterns used to generate the candidate additional fact, i.e., used to generate the extractions that were aggregated to generate the candidate additional fact.

Figure 6:
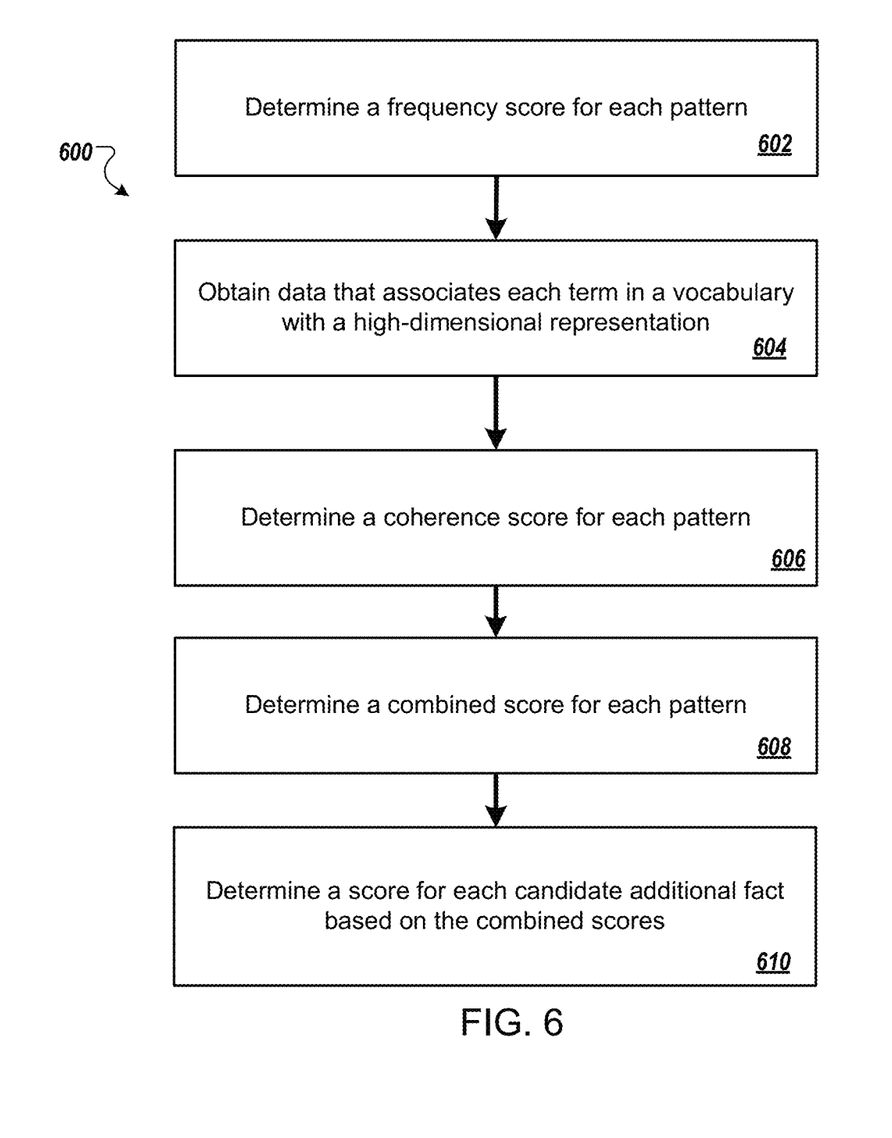
FIG. 6 is a flow diagram of an example process for scoring candidate additional facts.

FIG. 6 is a flow diagram of an example process 600 for scoring candidate additional facts. For convenience, the process 600 will be described as being performed by a system of one or more computers located in one or more locations. For example, a fact extraction system, e.g., the fact extraction system 100 of FIG. 1, appropriately programmed in accordance with this specification, can perform the process 600.

The system determines a frequency score for each pattern (step 602). The frequency score for a given pattern is a function of the total number of extractions produced by applying the pattern, e.g., as described above with reference to FIG. 5. For example, in some implementations, the frequency score is equal to the total number of extractions. In some other implementations, the frequency score is a logarithm, e.g., a base ten or base e logarithm, of the total number of extractions. In some implementations, the system uses the total number of distinct extractions produced by applying the pattern, i.e., by only counting two extractions that are the same as a single extraction produced by applying the pattern.

The system obtains data that associates each term in a vocabulary of terms with a respective high-dimensional representation of the term (step 604), i.e., gives each term a location in the high-dimensional space. The associations are generated so that the relative locations of terms reflect semantic similarities between the terms. That is, the relative locations of terms in the high-dimensional space reflect semantic similarities, e.g., showing that, by virtue of their relative locations in the space the word "queen" is similar to the words "king" and "prince." Furthermore, relative locations in the space may show that the word "king" is similar to the word "queen" in the same sense as the word "prince" is similar to the word "princess," and, in addition, that the word "king" is similar to the word "prince" as the word "queen" is similar to the word "princess."

Associations of terms to high dimensional vector representations having these characteristics can be generated by training a machine learning system configured to process each term in the vocabulary of terms to obtain a respective numeric representation of each term in the vocabulary in the high-dimensional space and to associate each term in the vocabulary with the respective numeric representation of the term in the high-dimensional space. Example techniques for training such a system and generating the associations are described in Tomas Mikolov, Kai Chen, Greg S. Corrado, and Jeffrey Dean, *Efficient estimation of word representations in vector space*, International Conference on Learning Representations (ICLR), Scottsdale, Ariz., USA, 2013.

The system determines a coherence score for each pattern using the obtained data (step 606). Generally, the coherence score for a given pattern measures how semantically related the attributes for which the pattern generates facts are. The coherence score for a pattern that generates facts for attributes that are more semantically similar than the attributes for which another pattern generates facts will generally be higher than the coherence score for the other pattern.

In particular, in order to determine the coherence score for a given pattern, the system determines a high-dimensional representation for each attribute associated which the pattern and determines a pairwise coherence score between each possible pair of associated attributes. The pairwise coherence score between two attributes is a distance measure, e.g., a cosine similarity, between the high-dimensional representations for the attributes. In some implementations, the system uses a different distance measure than cosine similarity, e.g., Hamming distance or Jaccard similarity.

The system determines the coherence score for the pattern from the pairwise coherence scores between the attributes associated with the pattern. For example, the coherence score for the pattern can be an average of the pairwise coherence scores, e.g., a mean or a median, or a maximum of the pairwise coherence scores.

The system determines a combined score for each pattern by combining the coherence score and the frequency score for the pattern (step 608). For example, the combined score for the pattern can be a product of the coherence score and the frequency score or a sum of the coherence score and the frequency score.

The system determines a score for each candidate additional fact from the combined scores for the patterns (step 610). In particular, the score for a given candidate additional fact is a combination of the combined scores for each pattern used to generate the candidate additional fact. For example, the score for the candidate additional fact may be product of the combined scores or a sum of the combined scores.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
    obtaining a plurality of seed facts, wherein each seed fact identifies a subject entity, an attribute possessed by the subject entity, and an object, and wherein the object is an attribute value of the attribute possessed by the subject entity;
    generating a plurality of patterns from the seed facts, wherein each of the plurality of patterns is a dependency pattern generated from a dependency parse, wherein a dependency parse of a text portion corresponds to a directed graph of vertices and edges, wherein each vertex represents a token in the text portion and each edge represents a syntactic relationship between tokens represented by vertices connected by the edge, wherein each vertex is associated with the token represented by the vertex and a part of speech tag, and wherein a dependency pattern corresponds to a sub-graph of a dependency parse with one or more of the vertices in the sub-graph having a token associated with the vertex replaced by a variable;
    applying the patterns to documents in a collection of documents to extract a plurality of candidate additional facts from the collection of documents, wherein applying the patterns to documents in the collection of documents comprises:
        applying the dependency patterns to documents from the collection of documents to identify matching sentences;
        generating an extraction from each matching sentence; and
        aggregating the extractions to generate the candidate additional facts; and
    selecting one or more additional facts from the plurality of candidate additional facts.

2. The method of claim 1, wherein obtaining the plurality of seed facts comprises:
    receiving a set of extraction rules, wherein each extraction rule is a predetermined rule for generating a fact from text;
    applying the extraction rules to documents from the collection of documents to extract a plurality of candidate seed facts;
    determining whether each of the candidate seed facts is valid; and
    selecting the valid candidate seed facts as seed facts.

3. The method of claim 2, wherein determining whether each of the candidate seed facts is valid comprises:
    determining whether an attribute identified by the candidate seed fact is identified as an attribute in an attribute repository;
    determining whether the attribute identified by the candidate seed fact and the object identified by the candidate seed fact were classified as referring to the same entity in a text fragment from which the candidate seed fact was extracted; and
    classifying as valid each candidate seed fact that identifies an attribute from the attribute repository and that identifies an attribute and an object that were classified as referring to the same entity.

4. The method of claim 1, wherein generating the plurality of patterns from the seed facts comprises, for each of the seed facts:
    identifying sentences in the collection of documents that match the seed fact;
    identifying a respective minimal sub-graph of a dependency parse of each of the matching sentences, wherein the minimal sub-graph of a dependency parse is a smallest portion of the dependency parse that includes vertices representing head tokens of a subject entity, attribute, and object identified by the seed fact; and
    generating a respective dependency pattern from each minimal sub-graph by replacing the tokens associated with one or more of the vertices representing the head tokens of the subject entity, the attribute, or the object identified by the seed fact with a variable.

5. The method of claim 1, wherein selecting the one or more additional facts from the plurality of candidate additional facts comprises:
    determining a respective score for each candidate additional fact; and
    selecting one or more of the candidate additional facts as additional facts based on the scores.

6. The method of claim 5, wherein determining the respective score for each candidate additional fact comprises:
    determining a respective combined score for each pattern used to generate the candidate additional fact; and
    determining the score for the candidate additional fact from the combined scores of the patterns used to generate the candidate additional fact.

7. The method of claim 6, wherein determining the respective combined score for each pattern used to generate the candidate additional fact comprises:
    determining a frequency score for the pattern from a total number of extractions generated by applying the pattern;
    determining a coherence score for the pattern that measures how semantically related the attributes for which the pattern generates facts are; and
    determining the combined score for the pattern by combining the frequency score and the coherence score.

8. The method of claim 7, where determining the coherence score for the pattern comprises:
- determining a respective high-dimensional vector representation of each attribute for which the pattern generates facts;
- determining, for each possible pair of attributes selected from the attributes for which the pattern generates facts, a respective pairwise coherence score from the high-dimensional vector representations of the attributes in the pair; and
- determining the coherence score for the pattern from the pairwise coherence scores.

9. The method of claim 8, wherein the pairwise coherence score for the pair is a distance measure between the high-dimensional vector representations of the attributes in the pair.

10. A system comprising one or more computers and one or more storage devices storing instructions that when executed by the one or more computers cause the one or more computers to perform operations comprising:
- obtaining a plurality of seed facts, wherein each seed fact identifies a subject entity, an attribute possessed by the subject entity, and an object, and wherein the object is an attribute value of the attribute possessed by the subject entity;
- generating a plurality of patterns from the seed facts, wherein each of the plurality of patterns is a dependency pattern generated from a dependency parse, wherein a dependency parse of a text portion corresponds to a directed graph of vertices and edges, wherein each vertex represents a token in the text portion and each edge represents a syntactic relationship between tokens represented by vertices connected by the edge, wherein each vertex is associated with the token represented by the vertex and a part of speech tag, and wherein a dependency pattern corresponds to a sub-graph of a dependency parse with one or more of the vertices in the sub-graph having a token associated with the vertex replaced by a variable;
- applying the patterns to documents in a collection of documents to extract a plurality of candidate additional facts from the collection of documents, wherein applying the patterns to documents in the collection of documents comprises:
  - applying the dependency patterns to documents from the collection of documents to identify matching sentences;
  - generating an extraction from each matching sentence; and
  - aggregating the extractions to generate the candidate additional facts; and
- selecting one or more additional facts from the plurality of candidate additional facts.

11. The system of claim 10, wherein obtaining the plurality of seed facts comprises:
- receiving a set of extraction rules, wherein each extraction rule is a predetermined rule for generating a fact from text;
- applying the extraction rules to documents from the collection of documents to extract a plurality of candidate seed facts;
- determining whether each of the candidate seed facts is valid; and
- selecting the valid candidate seed facts as seed facts.

12. The system of claim 11, wherein determining whether each of the candidate seed facts is valid comprises:
- determining whether an attribute identified by the candidate seed fact is identified as an attribute in an attribute repository;
- determining whether the attribute identified by the candidate seed fact and the object identified by the candidate seed fact were classified as referring to the same entity in a text fragment from which the candidate seed fact was extracted; and
- classifying as valid each candidate seed fact that identifies an attribute from the attribute repository and that identifies an attribute and an object that were classified as referring to the same entity.

13. The system of claim 10, wherein generating the plurality of patterns from the seed facts comprises, for each of the seed facts:
- identifying sentences in the collection of documents that match the seed fact;
- identifying a respective minimal sub-graph of a dependency parse of each of the matching sentences, wherein the minimal sub-graph of a dependency parse is a smallest portion of the dependency parse that includes vertices representing head tokens of a subject entity, attribute, and object identified by the seed fact; and
- generating a respective dependency pattern from each minimal sub-graph by replacing the tokens associated with one or more of the vertices representing the head tokens of the subject entity, the attribute, or the object identified by the seed fact with a variable.

14. The system of claim 10, wherein selecting the one or more additional facts from the plurality of candidate additional facts comprises:
- determining a respective score for each candidate additional fact; and
- selecting one or more of the candidate additional facts as additional facts based on the scores.

15. The system of claim 14, wherein determining the respective score for each candidate additional fact comprises:
- determining a respective combined score for each pattern used to generate the candidate additional fact; and
- determining the score for the candidate additional fact from the combined scores of the patterns used to generate the candidate additional fact.

16. The system of claim 15, wherein determining the respective combined score for each pattern used to generate the candidate additional fact comprises:
- determining a frequency score for the pattern from a total number of extractions generated by applying the pattern;
- determining a coherence score for the pattern that measures how semantically related the attributes for which the pattern generates facts are; and
- determining the combined score for the pattern by combining the frequency score and the coherence score.

17. The system of claim 16, where determining the coherence score for the pattern comprises:
- determining a respective high-dimensional vector representation of each attribute for which the pattern generates facts;
- determining, for each possible pair of attributes selected from the attributes for which the pattern generates facts, a respective pairwise coherence score from the high-dimensional vector representations of the attributes in the pair; and
- determining the coherence score for the pattern from the pairwise coherence scores.

18. A non-transitory computer storage medium encoded with a computer program, the computer program comprising instructions that when executed by one or more computers cause the one or more computers to perform operations comprising:

obtaining a plurality of seed facts, wherein each seed fact identifies a subject entity, an attribute possessed by the subject entity, and an object, and wherein the object is an attribute value of the attribute possessed by the subject entity;

generating a plurality of patterns from the seed facts, wherein each of the plurality of patterns is a dependency pattern generated from a dependency parse, wherein a dependency parse of a text portion corresponds to a directed graph of vertices and edges, wherein each vertex represents a token in the text portion and each edge represents a syntactic relationship between tokens represented by vertices connected by the edge, wherein each vertex is associated with the token represented by the vertex and a part of speech tag, and wherein a dependency pattern corresponds to a sub-graph of a dependency parse with one or more of the vertices in the sub-graph having a token associated with the vertex replaced by a variable;

applying the patterns to documents in a collection of documents to extract a plurality of candidate additional facts from the collection of documents, wherein applying the patterns to documents in the collection of documents comprises:

applying the dependency patterns to documents from the collection of documents to identify matching sentences;

generating an extraction from each matching sentence; and aggregating the extractions to generate the candidate additional facts; and selecting one or more additional facts from the plurality of candidate additional facts.

19. The computer storage medium of claim 18, wherein obtaining the plurality of seed facts comprises:

receiving a set of extraction rules, wherein each extraction rule is a predetermined rule for generating a fact from text;

applying the extraction rules to documents from the collection of documents to extract a plurality of candidate seed facts;

determining whether each of the candidate seed facts is valid; and selecting the valid candidate seed facts as seed facts.

20. The computer storage medium of claim 19, wherein determining whether each of the candidate seed facts is valid comprises:

determining whether an attribute identified by the candidate seed fact is identified as an attribute in an attribute repository;

determining whether the attribute identified by the candidate seed fact and the object identified by the candidate seed fact were classified as referring to the same entity in a text fragment from which the candidate seed fact was extracted; and classifying as valid each candidate seed fact that identifies an attribute from the attribute repository and that identifies an attribute and an object that were classified as referring to the same entity.

21. The computer storage medium of claim 18, wherein generating the plurality of patterns from the seed facts comprises, for each of the seed facts:

identifying sentences in the collection of documents that match the seed fact;

identifying a respective minimal sub-graph of a dependency parse of each of the matching sentences, wherein the minimal sub-graph of a dependency parse is a smallest portion of the dependency parse that includes vertices representing head tokens of a subject entity, attribute, and object identified by the seed fact; and generating a respective dependency pattern from each minimal sub-graph by replacing the tokens associated with one or more of the vertices representing the head tokens of the subject entity, the attribute, or the object identified by the seed fact with a variable.

22. The computer storage medium of claim 18, wherein selecting the one or more additional facts from the plurality of candidate additional facts comprises:

determining a respective score for each candidate additional fact; and selecting one or more of the candidate additional facts as additional facts based on the scores.

23. The computer storage medium of claim 22, wherein determining the respective score for each candidate additional fact comprises:

determining a respective combined score for each pattern used to generate the candidate additional fact; and determining the score for the candidate additional fact from the combined scores of the patterns used to generate the candidate additional fact.

24. The computer storage medium of claim 23, wherein determining the respective combined score for each pattern used to generate the candidate additional fact comprises:

determining a frequency score for the pattern from a total number of extractions generated by applying the pattern;

determining a coherence score for the pattern that measures how semantically related the attributes for which the pattern generates facts are; and determining the combined score for the pattern by combining the frequency score and the coherence score.

25. The computer storage medium of claim 24, where determining the coherence score for the pattern comprises:

determining a respective high-dimensional vector representation of each attribute for which the pattern generates facts;

determining, for each possible pair of attributes selected from the attributes for which the pattern generates facts, a respective pairwise coherence score from the high-dimensional vector representations of the attributes in the pair; and determining the coherence score for the pattern from the pairwise coherence scores.

* * * * *